United States Patent [19]

McIntyre

[11] Patent Number: 4,552,480
[45] Date of Patent: Nov. 12, 1985

[54] BALL JOINT STRUCTURE
[75] Inventor: Allan E. McIntyre, LaPorte, Ind.
[73] Assignee: Sprague Devices, Inc., Michigan City, Ind.
[21] Appl. No.: 626,236
[22] Filed: Jun. 29, 1984
[51] Int. Cl.⁴ .............................................. F16C 11/06
[52] U.S. Cl. ....................................... 403/76; 403/71; 403/134
[58] Field of Search ....................... 403/71, 70, 76, 134

[56] References Cited
U.S. PATENT DOCUMENTS

| | | | |
|---|---|---|---|
| 3,389,925 | 6/1968 | Gottschald | 403/36 |
| 3,749,431 | 7/1973 | Schmid et al. | 403/76 |
| 3,853,414 | 12/1974 | Hirano et al. | 403/76 X |
| 3,861,812 | 1/1975 | Ito | 403/71 |
| 4,266,883 | 5/1981 | Riester et al. | 403/76 X |

Primary Examiner—Andrew V. Kundrat
Attorney, Agent, or Firm—Eugene C. Knoblock

[57] ABSTRACT

A ball socket member molded of resilient resin material is open at one end to receive and retain a ball in a part spherical cavity within the body communicating with a chamber containing a lubricant. The socket member carries a skirt at its open end which is adapted to form a seal with a member which carries the ball to prevent leakage and/or contamination of lubrication contained within the body cavity. Relief grooves are formed in the socket member which distribute lubricant on the ball and vent excess lubrication from the cavity as the ball is pressed into the cavity. The socket member has a polygonal external surface having a circumferential groove formed therein which receives the portion of the linkage member surrounding a complementary polygonal opening therein, so as to anchor the socket member against rotation relative to the linkage member.

5 Claims, 4 Drawing Figures

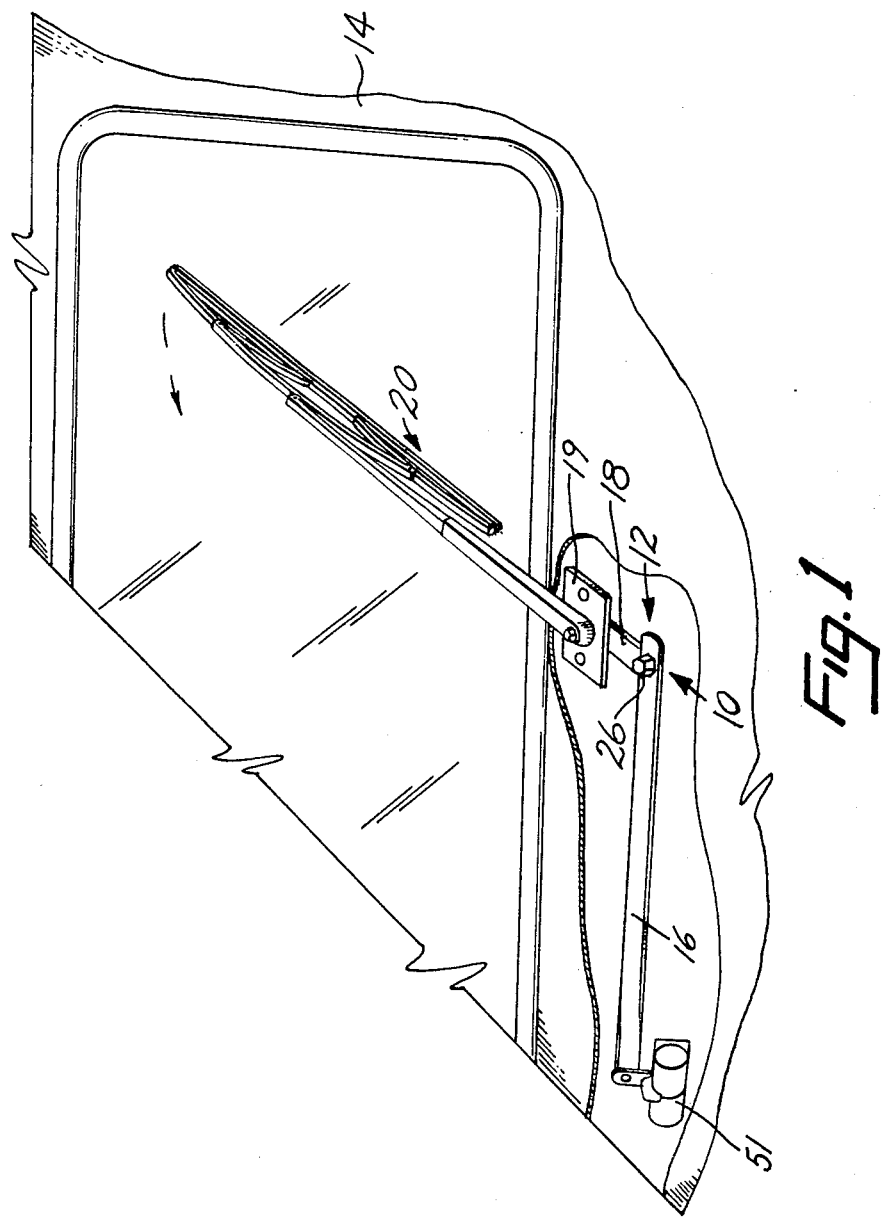

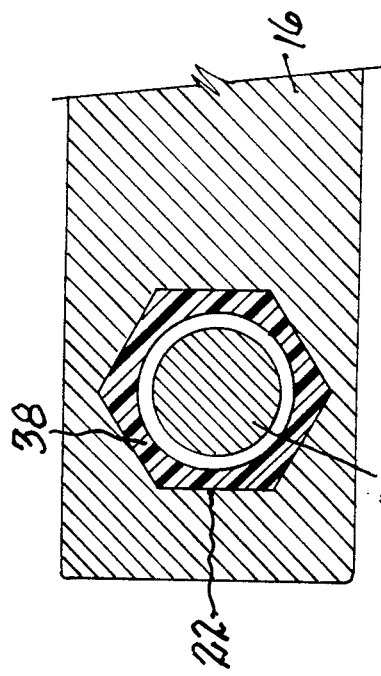
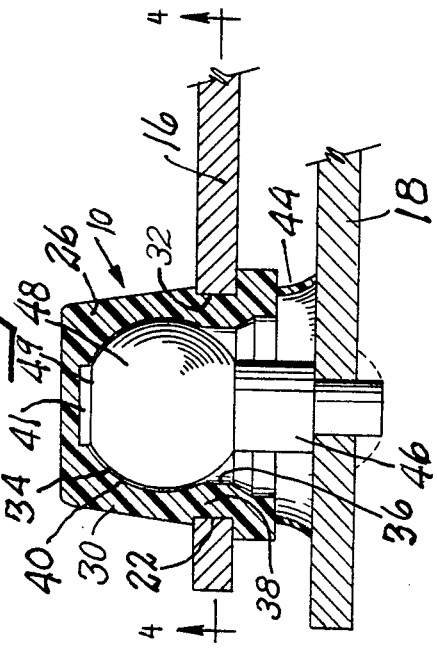
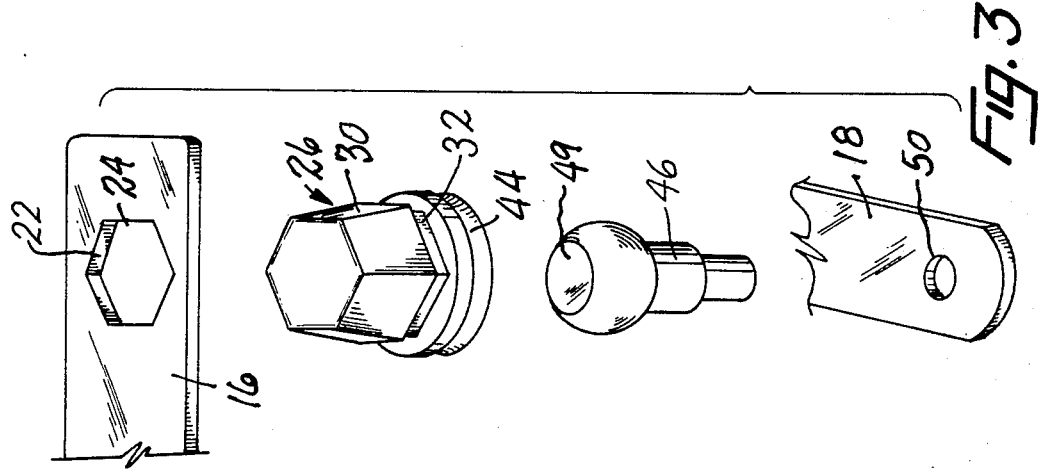

BALL JOINT STRUCTURE

SUMMARY OF THE INVENTION

This invention relates to an improved ball joint structure useful for a windshield wiper mechanism and characterized by novel locking and sealing structures.

The ball joint structure includes a ball socket body made of resilient resin which is open at one end and which has a flared skirt projecting from its open end. A cavity is formed in the socket body which receives a ball and stem. The socket body has internal relief grooves which distribute lubricant and vent excess lubricant in the cavity when the ball is pressed into the socket cavity. The socket body has an external circumferential groove formed therein which receives the portion of a link surrounding a polygonal opening in the link for securing the link to the socket body.

In use, the socket expands when the ball is forced into the socket cavity, and then retracts to substantially original shape. Similarly, when the socket is forced into the polygonal opening of the link, the outer surface of the socket deforms for passage into the link opening and then substantially returns to its original shape when the link is seated in the groove. The circumferential groove is positioned in the socket so that the major portion of the ball seats in the socket member inwardly of the link when the joint is assembled. The ball projects from one end of an arm which is connected to a lever. When the ball is seated in the socket cavity the socket skirt bears against the arm to form a seal. Any lubricant driven from the socket cavity upon insertion of the ball remains inside the skirt around the stem of the ball. The skirt prevents leakage and/or contamination of this lubricant.

Accordingly, it is an object of this invention to provide a novel and useful ball joint structure.

Another object is to provide a ball joint structure with a novel lubricant sealing capability.

Another object is to provide a ball joint structure with novel locking characteristics.

Another object is to provide a ball joint structure which includes a socket having an integral skirt for retaining and preventing contamination of lubricant in the socket.

Another object is to provide a ball joint structure including a socket having an external circumferential non circular groove for receiving the portion of a link surrounding a polygonal link opening.

Another object is to provide a ball joint structure having a socket member which requires no other member for sealing and locking of the socket in operative position in a joint.

Other objects of this invention will become apparent upon a reading of the following description.

BRIEF DESCRIPTION OF THE DRAWINGS

FIG. 1 is a fragmentary perspective view showing a windshield wiper blade assembly on a vehicle.

FIG. 2 is a sectional view of the ball joint windshield wiper linkage.

FIG. 3 is an exploded view of the parts of a ball joint windshield wiper linkage.

FIG. 4 is a sectional view taken in line 4—4 of FIG. 2.

DESCRIPTION OF THE PREFERRED EMBODIMENT

The preferred embodiment illustrated is not intended to be exhaustive or to limit the invention to the precise form disclosed. It is chosen and described to explain the principles of the invention and its application and practical use and to enable others skilled in the art to utilize the invention.

The ball joint structure 10 of this invention may be used with a windshield wiper linkage system 12 for a motor vehicle 14, such as a car or truck. Ball joint structure 10 is intended to provide a novel and useful connection of a windshield wiper to linkage system 12 and to seal lubricant within the structure.

In windshield wiper linkage system 12, a first drive link 16 extends from a motor 51 and is connected through ball joint structure 10 to a crank arm 18. Crank arm 18 is connected through a pivot shaft (not shown), pivoted in a stationary member 19, to mount a wiper arm/blade 20 so that reciprocating endwise movement of drive link 16 is transmitted to the wiper arm/blade 20 to cause lateral oscillatory movement of the wiper arm/blade.

Drive link 16 has a polygonal opening 22 formed therein which is preferably hexagonal as shown at 24. Ball joint unit 10 includes a socket member 26 which fits in drive link opening 22. Socket member 26 has a generally polygonal tapering outer surface 30, which is preferably hexagonal, for locking interfit with drive link opening 22. A circumferential recess or groove 32 is formed in socket body outer surface 30 and is of a width to snugly receive the drive link 16. The socket body at the base of groove 32 is substantially the same shape and size of link opening 22 so that socket 26 will not rotate relative to drive link 16 when it is assembled therewith. The tapered socket body has an outer dimension adjacent to groove 32 which is slightly greater than the dimension of link opening 22. The socket body 26 is formed of a resilient material, such as a polyamide resin, for example ST-801 Nylon, which yields when the socket body is pressed into drive link opening 22, but springs back to substantially its original shape when the link 16 is seated in groove 32, so that movement of socket member 26 relative to link 16 is negligible.

Socket member 26 has a part-spherical hollow cavity 34 formed therein which terminates in an open-ended cylindrical bore 36 which has a smaller diameter than the maximum diameter of spherical portion 34. A neck portion 38 of socket member 26 which surrounds bore 36 also forms the inner wall of groove 32. A plurality of substantially equi spaced slots 40 are formed in socket member 26 at spherical portion 34 and extend from cylindrical portion 36 to an inner relief lubricant chamber 41. Slots 40 serve to accomodate flow of lubricant within socket member 26. A skirt 44 is formed integrally with and projects from the mouth of socket member 26 concentric with the open end of socket portion 36 and preferably flares and is of greater diameter than the bore 36 of part 26.

Crank arm 18 mounts the stem 46 of a part spherical ball or head 48. The end of ball stem 46 may be fitted into an opening 50 in crank arm 18 and secured thereto, as by peening the end of the stem to form a rivet-like head. Spherical head 48 has a diameter slightly less than the diameter of spherical cavity portion 34 to engage the ribs between slots 40 and preferably has a flat end surface 49. The bore 36 of socket neck part 38 and of skirt 44 receives ball stem 46 with clearance.

In use, socket member 26 is secured to drive link 16 by pressing the socket member into opening 22 in the drive link, thus deforming the socket member until the portion of the link around opening 24 of the link is seated in socket groove 32. The shapes of link opening 24 and of the outer surface of socket part 26 at the base of groove 32 are complementary and interfit to prevent rotational and axial movement of socket 26 relative to the drive link 16. When ball 48 is pressed through the open end of socket cavity portion 38 the socket member 26 yields until ball 48 is seated in spherical cavity 34. Lubricant is inserted in a socket chamber 41 in an amount greater than the capacity of chamber 41 before the ball is pressed into the socket member. Thus, as the ball 48 is pressed into the spherical cavity of the socket, lubricant is forced through slots 40 and around the ball. When ball 48 is seated in spherical cavity 34 of the socket the margin of skirt 44 bears continuously against crank arm 18 about ball stem 46 with enough pressure to slightly deform the skirt and maintain contact with the crank arm as the socket 26 rotates relative to the ball 48 and arm 18. Lubricant which is forced from hollow, spherical portion 34 of the socket is confined within skirt 44 about ball stem 46. Skirt 44 is sufficiently flexible to accomodate cant, i.e., limited angular displacement of arm 18 relative to link 16 during movement of the parts. Skirt 44 deforms to the angle of cant during the repetitive functioning of linkage system 12. Maintained contact between skirt 44 and crank arm 18 prevents lubricant leakage and entry of contaminants into the lubricant. Ball 48 and stem 46 are preferably formed of stainless steel to eliminate the ball and stem as a source of corrosion and scoring of socket member 26.

It is to be understood that this invention is not to be limited by the terms of the above description but may be modified within the scope of the appended claims.

I claim:

1. A ball joint structure for connecting a drive link and the free end of a pivotally mounted crank arm, comprising a socket member having a cavity including a part-spherical portion, a restricted neck portion and a flexible flaring skirt portion extending from the mouth of said cavity, means detachably mounting said socket member on said link in a manner restrained against rotation, and a ball carried by the free end of said crank arm, the restricted neck of said socket member having an inner diameter smaller than the diameter of said ball, said socket member being resilient to accomodate insertion of said ball into said spherical cavity portion, said skirt engaging said crank arm when said ball is received in said spherical cavity portion.

2. The ball joint structure of claim 1, and a lubricant chamber communicating with the cavity of said socket member, said skirt engaging said crank arm to maintain a seal retaining lubricant during relative movement of said ball and said socket member.

3. The ball joint structure of claim 1, wherein said socket member has a tapered polygonal outer surface and a circumferential groove having a polygonal inner wall, said drive link having a polygonal opening complementary to said groove inner wall, the fit of said drive link in said groove constituting said means detachably mounting said socket member on said link.

4. The ball joint structure of claim 3, wherein said circumferential groove is formed in the exterior of the restricted neck portion of said socket member.

5. The ball joint structure of claim 2, wherein the spherical portion of said cavity is interupted by a plurality of grooves extending from said lubricant chamber to said restricted neck portion.

* * * * *